(12) United States Patent
Ji et al.

(10) Patent No.: US 12,443,368 B2
(45) Date of Patent: Oct. 14, 2025

(54) STORAGE DEVICE AND MEMORY SYSTEM

(71) Applicant: SAMSUNG ELECTRONICS CO., LTD., Suwon-si (KR)

(72) Inventors: Soo Young Ji, Seoul (KR); Joo Young Kim, Daejeon (KR); Ji Hoon Kim, Daejeon (KR); Jae Young Do, Daejeon (KR); Yeo Reum Park, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 17/696,586

(22) Filed: Mar. 16, 2022

(65) Prior Publication Data

US 2023/0072613 A1 Mar. 9, 2023

(30) Foreign Application Priority Data

Sep. 9, 2021 (KR) ........................ 10-2021-0120512

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
USPC ...................................................... 711/154
See application file for complete search history.

(56) References Cited

U.S. PATENT DOCUMENTS

| | | | |
|---|---|---|---|
| 7,464,088 B1 * | 12/2008 | Chiang | G06F 16/90344 |
| 9,269,041 B2 | 2/2016 | McCormick et al. | |
| 10,042,813 B2 | 8/2018 | Goldman | |
| 10,719,474 B2 | 7/2020 | Kachare et al. | |
| 10,949,214 B2 | 3/2021 | Khan et al. | |
| 10,956,346 B1 | 3/2021 | Ben-Yehuda et al. | |
| 2013/0185270 A1* | 7/2013 | Brower | G06F 16/2343 707/704 |
| 2016/0292209 A1* | 10/2016 | Asaad | G06F 16/24569 |

(Continued)

FOREIGN PATENT DOCUMENTS

CN 110909197 3/2020

OTHER PUBLICATIONS

Ji-Hoon, et al., "Accelerating Large-Scale Nearest Neighbor Search with Computational Storage Device", 2021 IEEE 29th Annual International Symposium on Field-Programmable Custom Computing Machines (FCCM).

*Primary Examiner* — Gautam Sain
(74) *Attorney, Agent, or Firm* — MORGAN, LEWIS & BOCKIUS LLP

(57) ABSTRACT

A storage device is provided. The storage device includes a controller which receives a command from a host for instructing performance of a first computation, a non-volatile memory which stores a plurality of datasets, a buffer memory to which a first dataset among the plurality of datasets stored in the non-volatile memory is provided in response to the command, and an accelerator which performs the first computation corresponding to the command, using the first dataset provided to the buffer memory. The accelerator includes a memory access module which receives a first input query for instructing the first computation and the first dataset from the buffer memory, and a first computing module which is connected to the memory access module and determines first final candidate data corresponding to the first input query, using the first dataset.

20 Claims, 17 Drawing Sheets

(56) References Cited

U.S. PATENT DOCUMENTS

| | | | |
|---|---|---|---|
| 2017/0046382 A1* | 2/2017 | Li | G06F 16/2264 |
| 2017/0140012 A1* | 5/2017 | Bortnikov | G06V 10/763 |
| 2018/0081623 A1* | 3/2018 | Behrend | G06F 13/4282 |
| 2018/0373760 A1* | 12/2018 | Verma | G06F 3/064 |
| 2020/0089684 A1* | 3/2020 | Gotmanov | G06F 16/9535 |
| 2020/0257629 A1* | 8/2020 | Pinto | G06F 12/0868 |
| 2021/0004406 A1 | 1/2021 | Chen et al. | |
| 2021/0103780 A1 | 4/2021 | Mammou et al. | |

* cited by examiner

DATA SET 1

FIG. 7

Index Table (Top Layer to Layer 0)
Size & Pointer Information of all Layers

| | Layer 0 {size, pointer} | ... | Layer ($L_1$-1) {size, pointer} | Layer $L_1$ {size, pointer} |
|---|---|---|---|---|
| | Layer 0 {size, pointer} | ... | Layer ($L_2$-1) {size, pointer} | Layer $L_2$ {size, pointer} |
| | ⋮ | | | |
| | Layer 0 {size, pointer} | ... | Layer ($L_N$-1) {size, pointer} | Layer $L_N$ {size, pointer} |

Number of total points (rows) / Layer Number (Top Layer to Layer 0) (columns)

STORAGE DEVICE AND MEMORY SYSTEM

STATEMENT REGARDING SPONSORED RESEARCH

This patent was supported in part by the MSIT (Ministry of Science and ICT), Korea, under the ITRC (Information Technology Research Center) support program (IITP-2020-0-01847) supervised by the IITP (Institute for Information & Communications Technology Planning & Evaluation), and Samsung Electronics Co., Ltd (IO201210-07991-01).

CROSS-REFERENCE TO RELATED APPLICATION

This U.S. non-provisional patent application claims priority under 35 U.S.C. 119 to Korean Patent Application No. 10-2021-0120512 filed on Sep. 9, 2021 in the Korean Intellectual Property Office, the contents of which is incorporated by reference in its entirety herein.

1. TECHNICAL FIELD

The present invention relates to a storage device and a memory system.

2. DISCUSSION OF RELATED ART

Hardware acceleration refers to the process by which an application will offload certain computing tasks onto specialized hardware components (e.g., accelerators) within the system. Examples of hardware accelerators includes a graphics processing unit (GPU), an application-specific integrated circuit (ASIC), and a neural processing unit (NPU).

There are increased attempts to improve a processing speed of an electronic device by coupling a processor and the accelerator. Such attempts have been made in various fields, and much research is being carried out on a storage device having an accelerator-based platform, especially in a large-capacity storage device such as a solid state drive (SSD).

A general storage device has a function of storing data according to control of a host device. Storage devices that support various computation operations or various applications in the storage device have been developed to reduce computation load of the host device.

SUMMARY

At least one embodiment of the present invention provides a storage device having improved performance and efficiency.

At least one embodiment of the present invention provides a memory system having improved performance and efficiency.

According to an embodiment of the present inventive concept, there is provided a storage device including a controller, a non-volatile memory, a buffer memory, and an accelerator. The controller receives a command for instructing performance of a first computation from a host. The non-volatile memory stores a plurality of datasets. A first dataset among the plurality of datasets stored in the non-volatile memory is provided to the buffer memory in response to the command. The accelerator performs the first computation corresponding to the command, using the first dataset provided to the buffer memory. The accelerator includes a memory access module which receives a first input query for instructing the first computation and the first dataset from the buffer memory, and a first computing module which is connected to the memory access module and determines first final candidate data corresponding to the first input query, using the first dataset.

According to an embodiment of the present inventive concept, there is provided a memory system including a host and a first storage device. The host provides a command for instructing performance of a first computation. The command is provided from the host to the first storage device. The first storage device includes a first controller which controls the first storage device in response to the command, a first non-volatile memory which stores a first dataset, a first buffer memory which receives the first dataset from the first non-volatile memory in response to the command, and a first accelerator which performs the first computation corresponding to the command, using the first dataset provided to the first buffer memory. The first accelerator includes a first memory access module which receives a first input query for instructing the first computation and the first dataset from the first buffer memory, and a first computing module which is connected to the first memory access module and determines first final candidate data corresponding to the first input query, using the first dataset. The first accelerator provides the host with the first final candidate data.

According to an embodiment of the present inventive concept, there is provided a storage device including a controller, a non-volatile memory, a buffer memory, and an accelerator. The storage device receives a command from a host for instructing performance of a first computation and generates a control signal corresponding to the command. The non-volatile memory stores a first dataset and a second dataset. The buffer memory receives the first dataset and the second dataset from the non-volatile memory in a peer-to-peer communication in response to the control signal. The accelerator generates a first final result data corresponding to the control signal, using the first dataset and the second dataset provided to the buffer memory. The accelerator includes a memory access module which receives a first input query corresponding to the control signal, the first dataset, and the second dataset from the buffer memory, and a first computing module which generates a first final candidate data corresponding to the first input query using the first dataset, and generates a second final candidate data corresponding to the first input query using the second dataset. The first computing module provides the memory access module with the first final candidate data and the second final candidate data. The memory access module generates the first final result data using the first final candidate data and the second final candidate data, and provides the first final result data to the host.

However, embodiments of the present invention are not restricted to the those set forth herein. Exemplary embodiments of the present invention and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present disclosure will become more apparent by describing in detail exemplary embodiments thereof with reference to the attached drawings, in which:

FIGS. 7 to 10 are diagrams for explaining a dataset stored in a non-volatile memory of the storage device according to an embodiment of the present invention.

DETAILED DESCRIPTION OF THE EMBODIMENTS

Hereinafter, embodiments according to the technical idea of the present invention will be described referring to the accompanying drawings.

Figure 1:
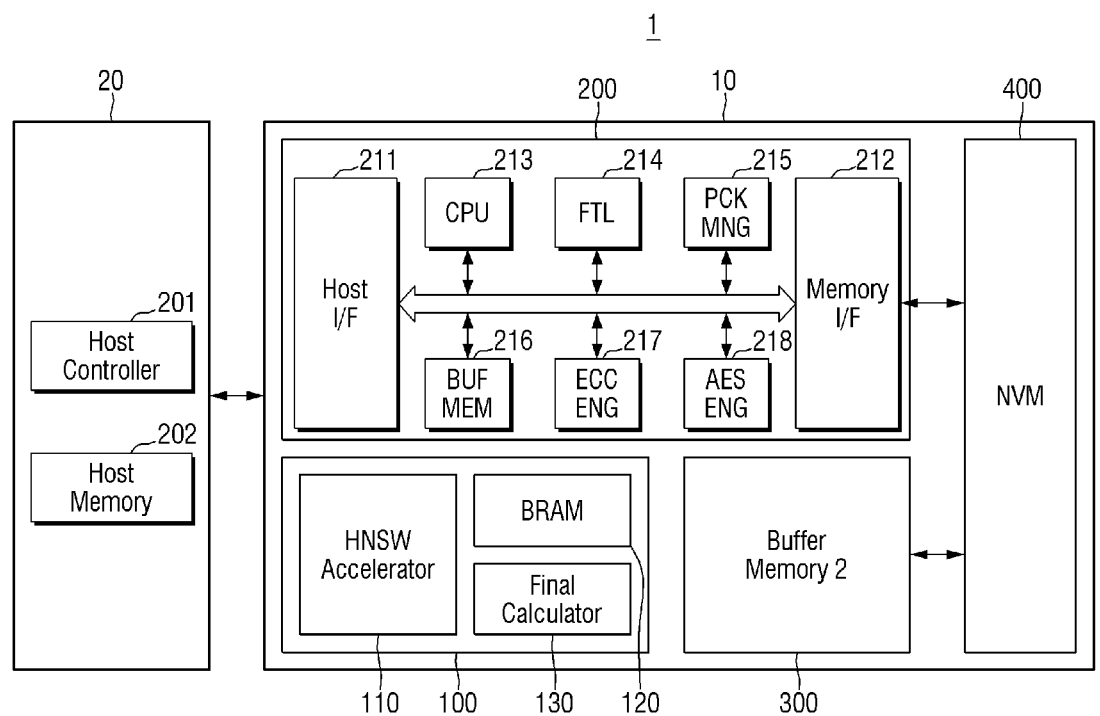
FIG. 1 is a diagram showing a memory system according to an embodiment of the present invention.
Figure 2:
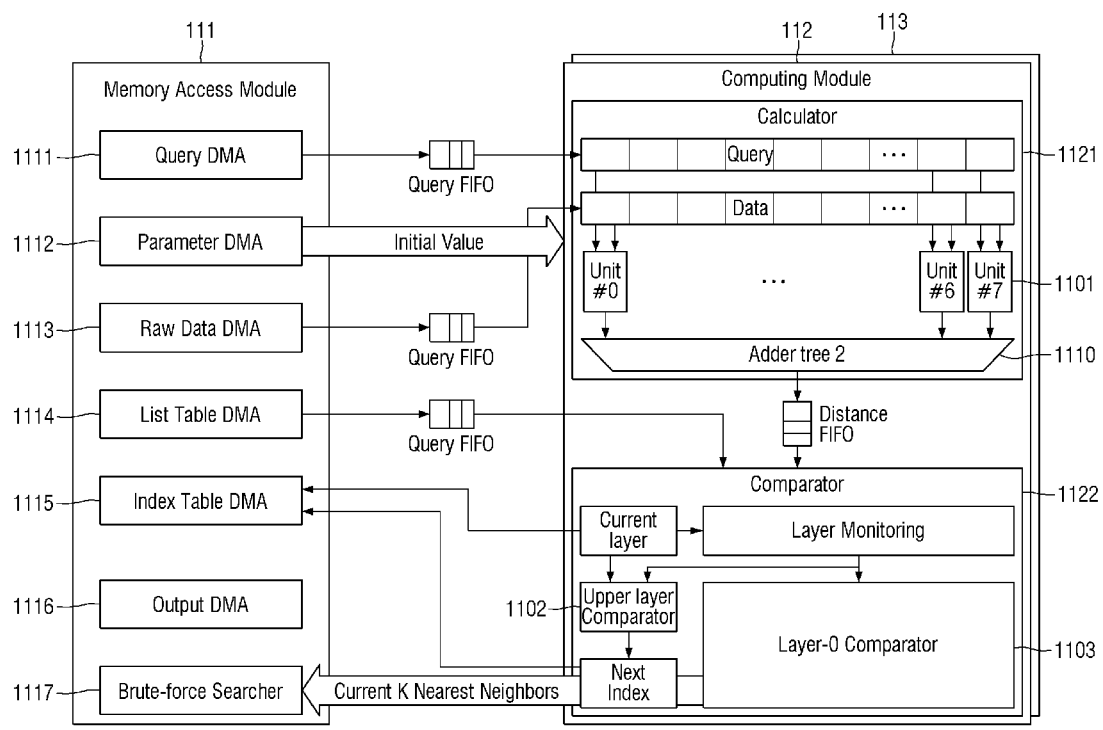
FIG. 2 is a diagram showing an accelerator according to an embodiment of the present invention.
Figure 3:
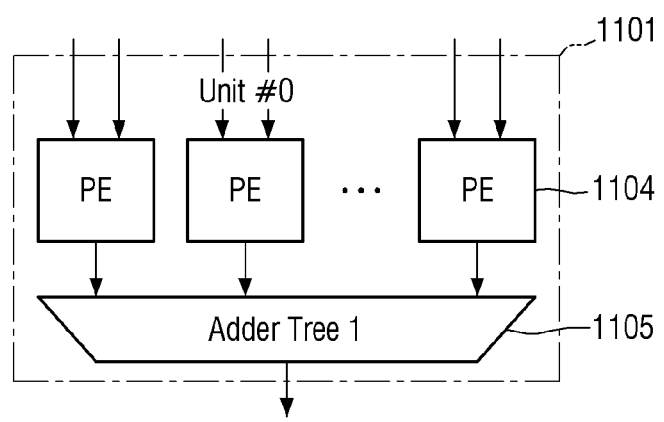
FIG. 3 is a diagram showing a distance calculation unit of FIG. 2 according to an embodiment of the present invention.
Figure 4:
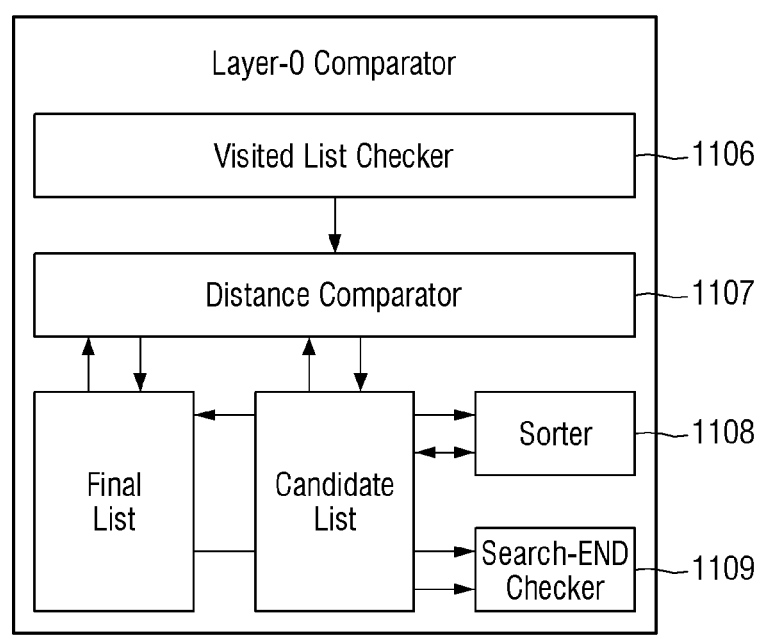
FIG. 4 is a diagram showing a layer-0 comparator of FIG. 2 according to an embodiment of the present invention.

FIG. 1 is a diagram showing a memory system according to an embodiment of the present invention. FIG. 2 is a diagram showing an accelerator according to an embodiment of the present invention. FIG. 3 is a diagram showing a distance calculation unit of FIG. 2 according to an embodiment of the present invention. FIG. 4 is a diagram showing a layer-0 comparator of FIG. 2 according to an embodiment of the present invention.

Referring to FIG. 1, a memory system 1 according to an embodiment may include a storage device 10 and a host 20 (e.g., a host device).

The host 20 may include a host controller 201 (e.g., a control circuit) and a host memory 202. The host memory 202 may function as a buffer memory for temporarily storing data to be transmitted to the storage device 10 or the data transmitted from the storage device 10.

The storage device 10 may include an FPGA 100, a storage controller 200 (e.g., a control circuit), a second buffer memory 300, and a non-volatile memory 400.

The storage device 10 may include a storage medium for storing data in accordance with a request from the host 20. For example, the storage device 10 may include at least one of a Solid State Drive (SSD), an embedded memory, and a detachable external memory. When the storage device 10 is an SSD, the storage device 10 may be a device that that complies with a non-volatility memory express (NVMe) standard. When the storage device 10 is an embedded memory or an external memory, the storage device 10 may be a device that complies with a universal flash storage (UFS) or an embedded multimedia card (eMMC) standard.

The storage device 10 and the host 20 may each generate and transmit packets according to the adopted standard protocols.

When the non-volatile memory 400 of the storage device 10 includes a flash memory, such a flash memory may include a two-dimensional (2D) NAND memory array or a three-dimensional (3D) (or vertical) NAND (VNAND) memory array. As another example, the storage device 10 may include various other types of non-volatile memories. For example, as the storage device 10, a Magnetic RAM (MRAM), a spin-transfer torque MRAM, a Conductive bridging RAM (CBRAM), a Ferroelectric RAM (ReRAM), a Phase RAM (PRAM), a resistive memory, a Resistive RAM, and various other types of memory may be applied.

The FPGA 100 may include an accelerator 110, a block RAM (BRAM) 120, and a final calculator 130 (e.g., calculator circuit, a logic circuit, etc.).

The FPGA 100 may perform various types of computations, calculations, and the like on the data stored in the second buffer memory 300. The FPGA 100 may perform the computation using a dataset temporarily stored in the second buffer memory 300, by utilizing an algorithm mapped to a hardware logic configuration. The FPGA 100 may perform the computation using the dataset stored in the non-volatile memory 400, without intervention of the host 20. That is, the storage device 10 including the FPGA 100 according to the present embodiment provides the dataset to the host 20 and the host 20 does not perform a computing process on the dataset to process the computation using the dataset stored in the non-volatile memory 400, and the storage device 10 may complete the computation by itself through the accelerator 110 embodied in the FPGA 100 and provide the host 20 with the calculated result data.

Referring to FIGS. 2 to 4, the accelerator 110 may include a memory access module 111 (e.g., a memory device) and a first computing module 112 (e.g., a processor). The accelerator 110 may perform the computation, using hierarchical navigable small world (HNSW) in a nearest neighbor search algorithm. Although the accelerator 110 is shown to perform the computation using the HNSW algorithm, this is merely an example for explanation, and embodiments of the present invention are not limited thereto. For example, the accelerator 110 may perform the computation, using an approximate nearest neighbor search algorithm. In another example, the accelerator 110 may perform the computation, using a fixed-radius near neighbors search algorithm.

The memory access module 111 may be provided with data and a query required for the computation to be performed by the accelerator 110. For example, the memory access module 111 may be provided with a query required for computation (e.g., input query) from a database stored in the non-volatile memory device 400. In another example, the memory access module 111 may be provided with the query required for the computation from the host 20. The memory access module 111 may be provided with a dataset from the second buffer memory 300. The memory access module 111 may provide result data generated from completing the computation to the second buffer memory 300 through the first computing module 112.

The memory access module 111 may include a query data direct memory access (DMA) 1111 (e.g., an interface circuit), a parameter data DMA 1112, a raw data DMA 1113, a list table DMA 1114, an index table DMA 1115, an output data DMA 1116, and a brute-force (BF) searcher 1117.

The first computing module 112 may include a calculator 1121 and a comparator 1122. The first computing module 112 may calculate a distance and traverse the neighbor points to search the nearest neighbor points of each layer included in the dataset.

The calculator 1121 may include a calculation unit 1101 and a second adder tree 1110 for calculating the distance between a vector of query data and a vector of data stored in the dataset. The calculator 1121 may calculate a Euclidean distance of the query and another data vector. As shown in FIG. 3, one calculation unit 1101 may include several processing units 1104 (e.g., 4, 8, 16, etc.) and a first adder tree 1105. The number of PE 1104 included in the calculation unit 1101 may be variously changed depending on the embodiment.

The comparator 1122 may include an upper layer comparator 1102 and a layer-0 comparator 1103. The comparator 1122 may compare the distance between the query calculated by the calculator 1121 and the vector of data stored in the dataset. The comparator 1122 may search a candidate neighbor point.

The accelerator 110 may further include a second computing module 113. The first computing module 112 and the second computing module 113 may perform the computing process using the dataset stored in the non-volatile memory 400 based on different input queries. Because the first computing module 112 and the second computing module 113 process data corresponding to different input queries, the data processing speed of the storage device 10 can be improved.

The BRAM 120 may receive a part of a list table from the second buffer memory 300 and cache it. The BRAM 120 may reduce the frequency of accessing the second buffer memory 300 in the process of the FPGA 100 performing the computation using the dataset, and may provide the data included in the cached list table to the accelerator 110. The BRAM 120 may be integrated on a same semiconductor chip as the accelerator 110.

The final calculator 130 may calculate the final result data, using the final candidate data generated from the accelerator 110. In an embodiment, the final calculator 130 may perform a Brute-force computation. For example, the Brute-force computation may include systematically enumerating all possible candidates for the solution and checking whether each candidates satisfies a certain condition. Although the final calculator 130 is shown to be included in the FPGA 100 in FIG. 1, embodiments of the invention are not limited thereto. In some embodiments, the final calculator 130 may be placed on a chip different from the FPGA 100. In some other embodiments, the final calculator 130 may be included in the host 20. In this case, the final candidate data is provided from the accelerator 110, and the final calculator 130 included in the host 20 may calculate the final result data.

The storage controller 200 may include a host interface 211 (e.g., an interface circuit), a memory interface 212 (e.g., an interface circuit), and a central processing unit (CPU) 213. Further, the storage controller 200 may further include a flash translation layer (FTL) 214, a packet manager 215 (e.g., a logic circuit), a first buffer memory 216, an error correction code (ECC) 217 engine (e.g., a logic circuit), and an advanced encryption standard (AES) engine 218. The storage controller 200 may further include a working memory (not shown) into which the flash translation layer (FTL) 214 is loaded, and when the CPU 213 executes the flash translation layer 214, the data read and write operations on the non-volatile memory can be controlled.

The host interface 211 may send and receive packets to and from the host 20. The packet transmitted from the host 20 to the host interface 211 may include a command or data to be written in the non-volatile memory 400, and the packet transmitted from the host interface 211 to the host 20 may include a response to a command, data read from the non-volatile memory 400, and the like. The memory interface 212 may transmit the data to be written on the non-volatile memory 400 to the non-volatile memory 400 or may receive the data that is read from the non-volatile memory 400. Such a memory interface 212 may be implemented to comply with standard protocols such as Toggle or ONFI.

The flash translation layer 214 may perform various functions such as address mapping, wear-leveling, and garbage collection. The address mapping operation is an operation of changing a logical address received from the host 20 into a physical address which is used for actually storing the data in the non-volatile memory 400. The wear-leveling is a technique for allowing blocks in the non-volatile memory 400 to be used uniformly to prevent an excessive degradation of a particular block, and may be implemented, for example, through a firmware technique for balancing the erasure counts of the physical blocks. The garbage collection is a technique for ensuring an available capacity in the non-volatile memory 400 by copying valid data of one or more blocks to a new block and then erasing the one or more blocks.

The packet manager 215 may generate a packet according to the protocol of the interface discussed with the host 20, or may parse various types of information from the packet received from the host 20.

The first buffer memory 216 may temporarily store the data to be recorded in the non-volatile memory 400 or the data to be read from the non-volatile memory 400. The first buffer memory 216 may be configured to be provided inside the storage controller 200, but may be placed outside the storage controller 200.

The ECC engine 217 may perform error detection and correction functions on the read data that is read from the non-volatile memory 400. More specifically, the ECC engine 217 may generate parity bits from the write data to be written to the non-volatile memory 400, and the parity bits thus generated may be stored in the non-volatile memory 400 together with the write data. When reading the data from the non-volatile memory 400, the ECC engine 217 may correct an error of the read data, using the parity bits that are read from the non-volatile memory 400 together with the read data, and output the read data with a corrected error.

The AES engine 218 may perform at least one of an encryption operation and a decryption operation of data which are input to the storage controller 200, using a symmetric-key algorithm.

When the FPGA 100 uses the dataset stored in the non-volatile memory 400, the second buffer memory 300 may temporarily store the dataset stored in the non-volatile memory 400 so that the FPGA 100 may use the dataset. In some embodiments, the second buffer memory 300 may be implemented as a semiconductor chip separate from the FPGA 100.

The non-volatile memory 400 may store the dataset that is used when the accelerator 110 performs the computation That is, the non-volatile memory 400 may function as a database for storing the dataset used for the computation of the accelerator 110.

Figure 5:
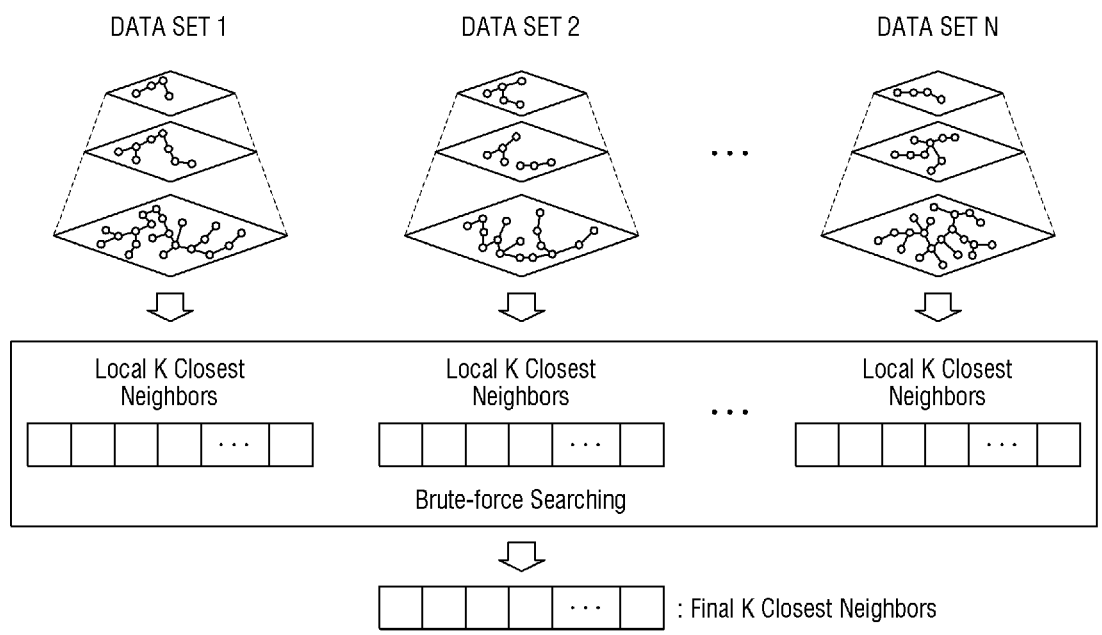
FIGS. 5 and 6 are diagrams for explaining the operation of a field programmable gate array (FPGA) including the accelerator according to an embodiment of the present invention.
Figure 6:
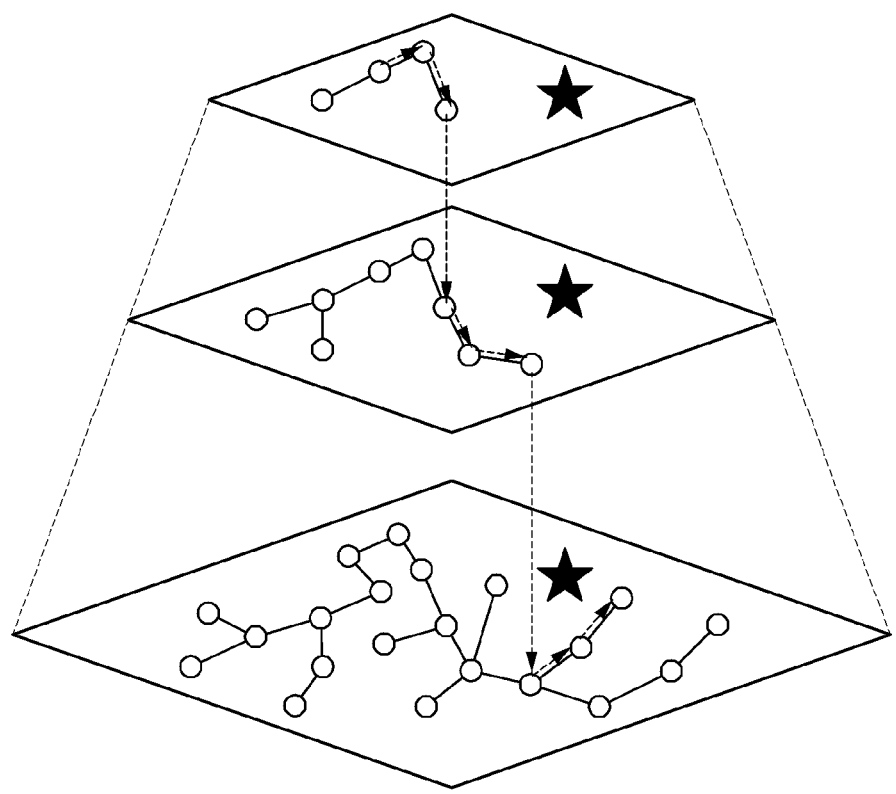
Figure 8:
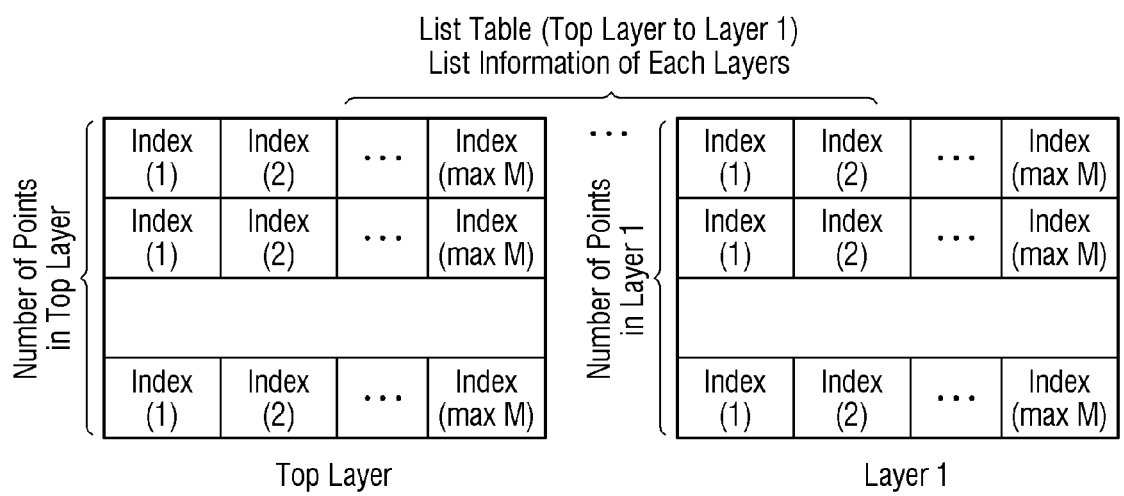
Figure 9:
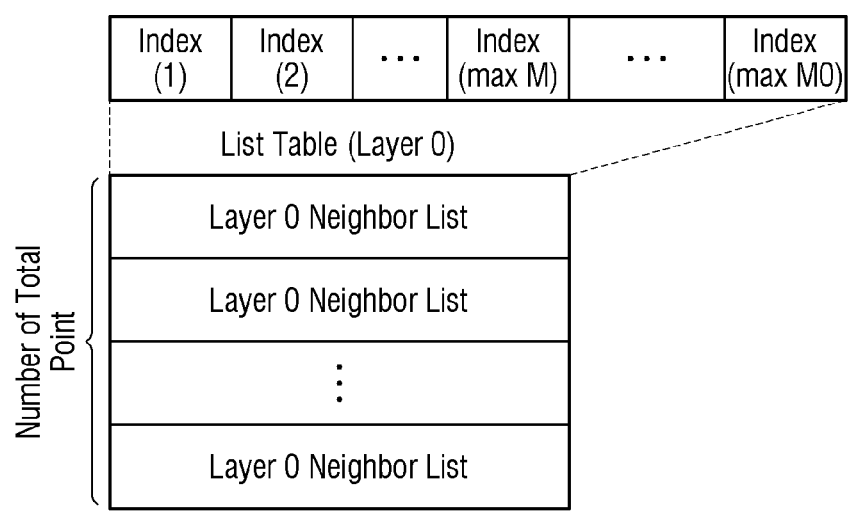
Figure 10:
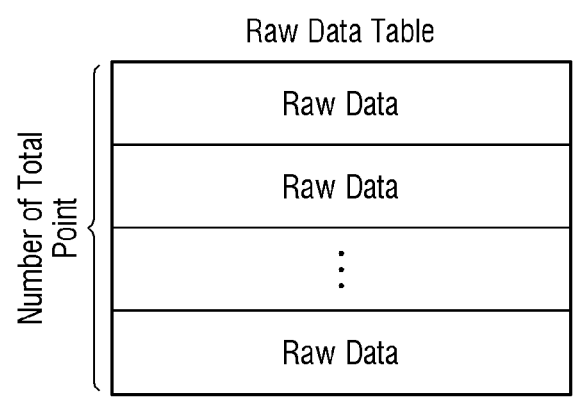

FIGS. 5 and 6 are diagrams for explaining the operation of the FPGA including the accelerator according to an embodiment of the disclosure.

Referring to FIGS. 5 and 6, the accelerator 110 according to an embodiment may process data, using the HNSW algorithm. However, the HNSW algorithm used by the accelerator 110 is merely an example for explanation, and embodiments of the disclosure are not limited thereto. The accelerator 110 may process data, using various algorithms depending on the embodiment.

The dataset processed by the accelerator 110 may include a graph structure. The graph structure formed by the data included in the dataset may include a plurality of layers. The plurality of layers may include a layer from a top layer to a layer 0. Each of the plurality of layers may include a plurality of points or nodes. The points may be connected via edges. The plurality of points may include vector information.

In a graph structure that may be implemented with the data included in the dataset, the top layer may include the smallest number of points. As the layer goes down, the number of points included in the layer increases. The layer 0 which is the lowest layer of the graph structure may include all the points of the dataset. A given layer may include all the points included in a previous layer, that is, a layer just above the given layer. The vertically adjacent layers may be connected through points accordingly.

In some embodiments, the accelerator 110 may initiate the search of the result data corresponding to an input query from the top layer. The accelerator 110 may find the point nearest to the input query in each layer and then start searching the lower layer on the basis of that point. For example, the accelerator 100 may search a given layer to find a point nearest to the input query and then search a layer adjacent to and lower than the given layer based on the found point.

The accelerator 110 according to some embodiments may obtain a local K nearest neighbor from each dataset, using the plurality of datasets. The local K nearest neighbor may include the final candidate data. The accelerator 110 according to some embodiments may obtain the final K nearest neighbor, using the local K nearest neighbor. That is, the accelerator 110 according to some embodiments may acquire the final result data, using the final candidate data.

Specifically, the accelerator 110 may repeat the process of finding the neighbor point nearest to the query in each layer from the top layer, and finding the nearest neighbor point, while advancing to the lower layer on the basis of that neighbor point. For example, if a first point is found in a first layer, the accelerator 110 could advance to a second lower layer and then determine which points of the second layer are nearest the first point. When the accelerator 110 finds the neighbor point nearest to the query in the layer 0, which is the lowest layer of the graph structure, the local K nearest neighbor which is the final candidate data may be generated.

The final calculator 130 may generate final result data, using the final candidate data generated using each dataset.

Although FIG. 5 shows that the final calculator 130 computes the final candidate data using the Brute-force search to generate the final result data, embodiments of the present invention are not limited thereto. The method by which the final calculator 130 computes the final candidate data to acquire the final result data may be variously modified according to the embodiment.

The operation in which the FPGA 100 including the accelerator 110 and the final calculator 130 performs the computing process of the dataset will be specifically described referring to FIGS. 7 to 13.

FIGS. 7 to 10 are diagrams for explaining a dataset stored in the non-volatile memory of the storage device according to some embodiments.

Referring to FIGS. 7 to 10, the dataset stored in the non-volatile memory 400 may include data of the form that may be computed by the accelerator 110. The dataset stored in the non-volatile memory 400 may include a plurality of layers of a graph structure that may be computed by the accelerator 110, and information about points included in each layer. Specifically, the dataset stored in the non-volatile memory 400 may include an index table, a list table, and a raw data table including a plurality of layers and information about points included in each layer.

The index table may store size information and pointer information for efficiently accessing the neighbor point list stored in the list table. Specifically, the index table may include size information and pointer information for all layers. The size information may include the number of points connected to the target point. The pointer information may be used to access the neighbor point list.

The index table may store the size and pointer of the list table in one packet from layer 0 to the top layer in order. It is possible to access the neighbor list through the pointer of the index table. It is possible to check how many pointers are valid in the neighbor list through the size information stored in the index table.

The list table may include a list table of layer 0 and a list table for layers other than layer 0. The list table of the other layers except layer 0 may include an index list of the neighbor point associated with the point included in that layer. The list table of layer 0 may store the neighbor point list of layer 0.

The raw data table may store raw vector data. Specifically, the raw data table may store raw vector data of all points.

Figure 11:
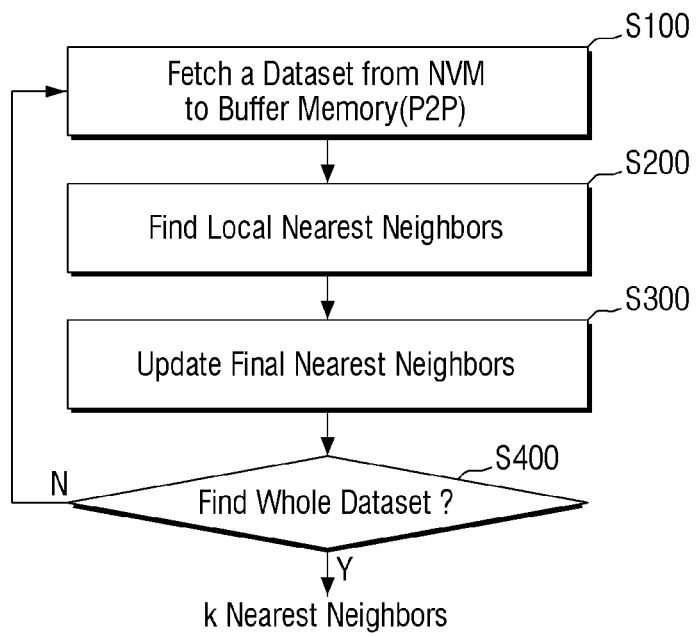
FIG. 11 is a flowchart for explaining an operation of the storage device according to an embodiment of the present invention.
Figure 12:
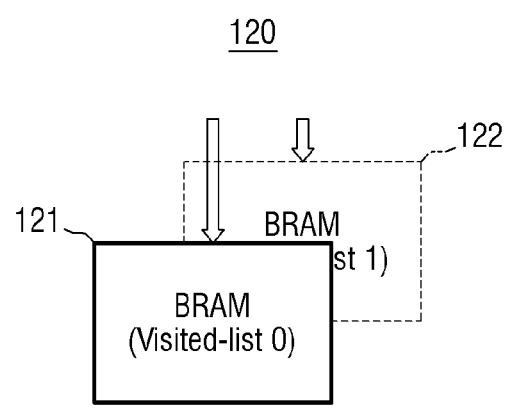
FIGS. 12 and 13 are diagrams for explaining an operation of the accelerator according to an embodiment of the present invention.
Figure 13:
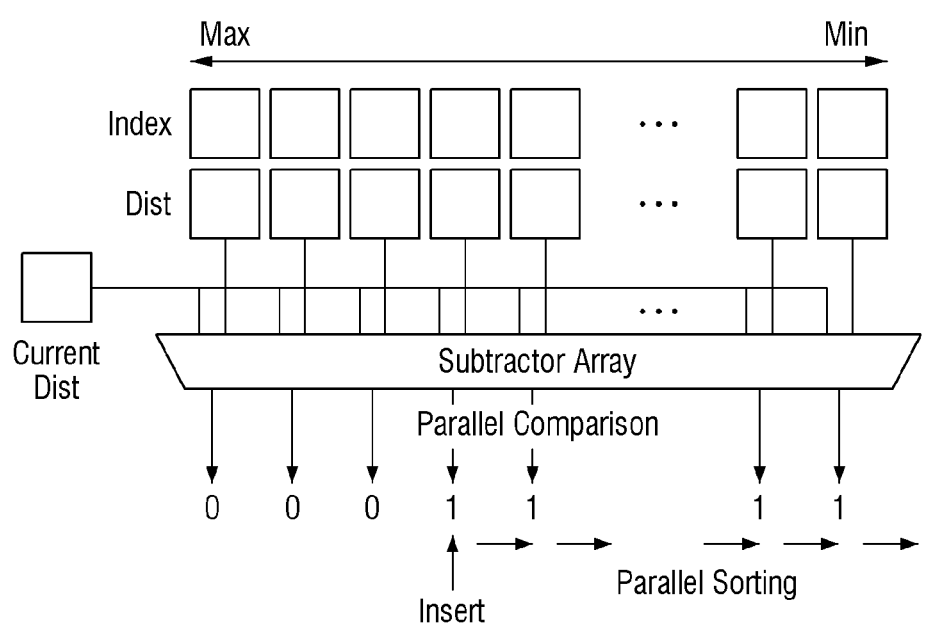

FIG. 11 is a flowchart for explaining the operation of the storage device according to an embodiment of the present invention. FIGS. 12 and 13 are diagrams for explaining the operation of the accelerator according to an embodiment of the disclosure.

Referring to FIGS. 1 and 11 to 13, the storage device 10 fetches a dataset from the non-volatile memory 400 to the second buffer memory 300 (S100). In an embodiment, the non-volatile memory 400 provides the dataset to the second buffer memory 300 in a peer-to-peer communication, using PCIe (Peripheral Component Interconnect express (PCIe). That is, when the dataset stored in the non-volatile memory 400 is provided to the second buffer memory 300, the dataset may be directly provided from the non-volatile memory 400 to the second buffer memory 300 without intervention of the host 20.

Subsequently, the storage device 10 finds the local nearest neighbor (S200). The local nearest neighbor may include final candidate data. Specifically, the accelerator 110 of the storage device 10 may search for the local nearest neighbor, using the dataset stored in the second buffer memory 300. The accelerator 110 may search for the local nearest neighbor in one dataset to generate single final candidate data.

Specifically, referring to FIGS. 1 to 4 and FIGS. 11 to 13, when a signal for instructing the start of computation is provided from the host 20 to the FPGA 100, a query DMA 1111 stores an input query in a query first-in-first-out (FIFO) from the second buffer memory 300, and the parameter DMA 1112 loads parameters including the maximum layer, the entry point, and the like.

The raw data DMA 1113 loads vector data of the entry point, and the calculator 1121 calculates a distance between the input query stored in the query FIFO by the query DMA 1111 and the vector of the entry point. The calculator 1121 may calculate a Euclidean distance between the input query and the entry point. The calculator 1121 includes a plurality of processing units (PE), each PE calculates a square of a difference between the input query and the entry point, and the adder tree may add up the results of all PEs. The method by which the calculator 1121 calculates the distance may be variously changed depending on the embodiment.

When an initial distance between the input query and the entry point is calculated, the comparator 1122 starts searching for the candidate point. When the distance calculated by the calculator 1121 is shorter than the minimum distance registered in an internal register, the upper layer comparator 1102 updates the minimum distance and sends an index to the index table DMA 1115.

The index table DMA 1115 accesses the index table included in the dataset stored in the second buffer memory 300, and the list table DMA 1114 fetches the neighbor point list of the target point. The raw data DMA 1113 reads the raw vectors of all neighbor point lists fetched by the list table DMA 1114, and the calculator 1121 continues to calculate the distance between the input query and the entry point. When a distance smaller than the minimum distance among the calculated distances is found, the upper layer comparator 1102 sends an index of the current minimum distance to the index table DMA 1115. When a distance smaller than the minimum distance among the calculated distances is not found, the upper layer comparator 1102 moves the searching from the current layer to the next lower layer, and sends the index of the current minimum distance to the index table DMA 1115 as the entry point in a new layer (adjacent lower layer) to start a new search. This process repeats until layer 0 is reached.

Referring to FIG. 11 again, the storage device 10 then updates the final nearest neighbor (S300). Specifically, when the accelerator 110 searches the point of the shortest distance while calculating the distance between the input query and the entry point in order from the top layer to layer 0, the information about the point may be updated in the list.

Referring to FIGS. 1, 4 and 11, the layer-0 comparator 1103 may perform a candidate search, by managing a visit list, a candidate list, and a final list. The visit list may include information about whether the calculation for the point was performed before to avoid repetition of the calculation.

The visit list may be initialized for each new query. The visit list may be initialized through the BRAM 120 of the FPGA 100. Specifically, the visit list may be stored in the BRAM 120. The BRAM 120 may include a BRAM 121 that stores an activated visit list, and a BRAM 122 that stores an initialized visit list. By coupling the visit list with the activated visit list and the initialized visit list, it is possible to prevent the latency in the visit list management including the initialization.

The candidate list may be continuously updated when traversing the layers of the graph structure. The final list is continually updated each time the minimum distance is searched. The final list may retain only the points nearest to the query as a list.

The final list may track the point having the longest distance among the included lists. The candidate points existing in the candidate list are read, and the neighbor point lists of the candidate points are calculated in order. If the distance between the sequentially calculated neighbor point and the query is smaller than the maximum distance of the final list, the calculated neighbor point may be added to the candidate list and the final list. If the final list is full, the current list of points of the farthest distance may be deleted from the final list and a new point having the updated maximum distance may be added to the final list.

The candidate list and the final list may be arranged each time a new index is added. That is, when a new index is added, the index may be added to the candidate and the final list. When the candidate list and the final list are arranged, the current distance may be subtracted in parallel from the distance included in the list. According to the result of performing the subtraction in parallel, it is determined whether the current distance is smaller than the corresponding index, and it may be selectively added to the candidate list or the final list.

The accelerator 110 may repeat this process until the candidate list does not include a list or the minimum distance of the candidate list is not smaller than the maximum distance of the final list.

All previous processes from the top layer to the layer just above layer 0 are completed, and the point nearest to the query starts to be searched in layer 0. The visited list checker 1106 of the layer-0 comparator 1103 may check if the current index has been calculated to avoid redundancy of the distance calculation. If the current index has never been visited and the distance between the current index and the query is smaller than the maximum distance of the final list, the current index and distance are added to the final list and the candidate list.

When the layer-0 comparator 1103 completes all the distance calculations and the neighbor point list of the current index is updated, it is checked whether the search-end checker 1109 may end the search. The search-end checker 1109 may end the search when the candidate list is empty or when the minimum distance of the candidate list is greater than the maximum distance of the final list. When the search is ended, the accelerator 110 may provide the points included in the final list to the first buffer memory 216 or the second buffer memory 300 through the output data DMA 1116.

When the candidate list is not empty, or when the minimum distance of the candidate list is smaller than the maximum distance of the final list, the search-end checker 1109 may send the current minimum index in the candidate list to the index table DMA 1115 to search the next index.

Referring to FIG. 11 again, the storage device 10 determines whether the whole dataset is searched (S400). Specifically, the storage device 10 may determine whether a whole dataset stored in the non-volatile memory 400 is computed by the accelerator 110. When the accelerator 110 determines the whole dataset has been searched, the storage device 10 may provide the host 20 with the final candidate data generated using each dataset. If a dataset that is not computed by the accelerator 110 remains, the storage device 10 may fetch the dataset from the non-volatile memory 400 to the buffer memory. The storage device 10 may continue to perform a computation on the newly fetched dataset, using the accelerator 110.

Figure 14:
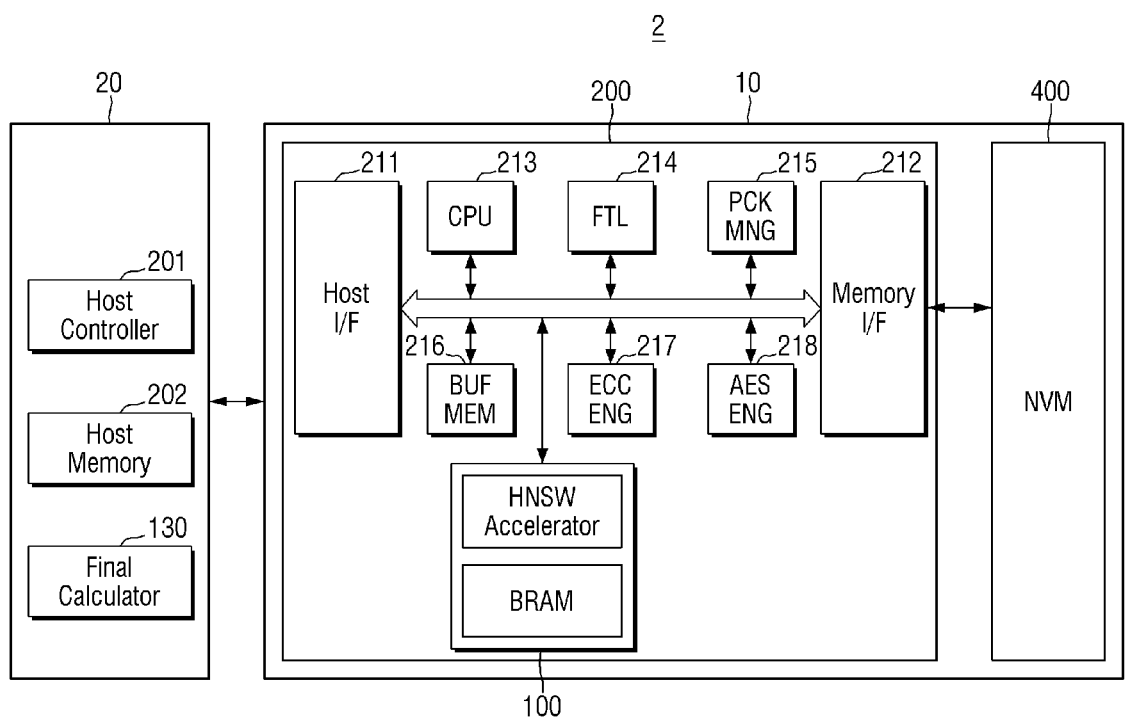
FIG. 14 is a diagram which shows the memory system according to an embodiment of the present invention.

FIG. 14 is a diagram which shows the memory system according to an embodiment of the present invention. For convenience of explanation, points different from those described referring to FIG. 1 will be mainly described.

Referring to FIG. 14, the memory system 2 includes a storage device 10 and a host 20.

The storage controller 200 of the storage device 10 may include the FPGA 100. When the FPGA 100 performs the computation using the dataset stored in the non-volatile memory 400, the non-volatile memory 400 may provide the dataset to the first buffer memory 216.

The host 20 may include a host controller 201, a host memory 202, and a final calculator 130.

The host memory 202 is provided with final candidate data from the accelerator 110 of the FPGA 100 and may temporarily store the final candidate data. That is, the host memory 202 may function as a buffer memory that stores the final candidate data provided from the accelerator 110.

The final calculator 130 may generate final result data, using the final candidate data stored in the host memory 202. The final calculator 130 may include a Brute-force calculator. The final calculator 130 may include an acceleration circuit for Brute-force computation. Therefore, the FPGA 100 may not separately include the final calculator 130. That is, the FPGA 100 may provide the host 20 with the final candidate data that has not been computed through the final calculator 130.

Figure 15:
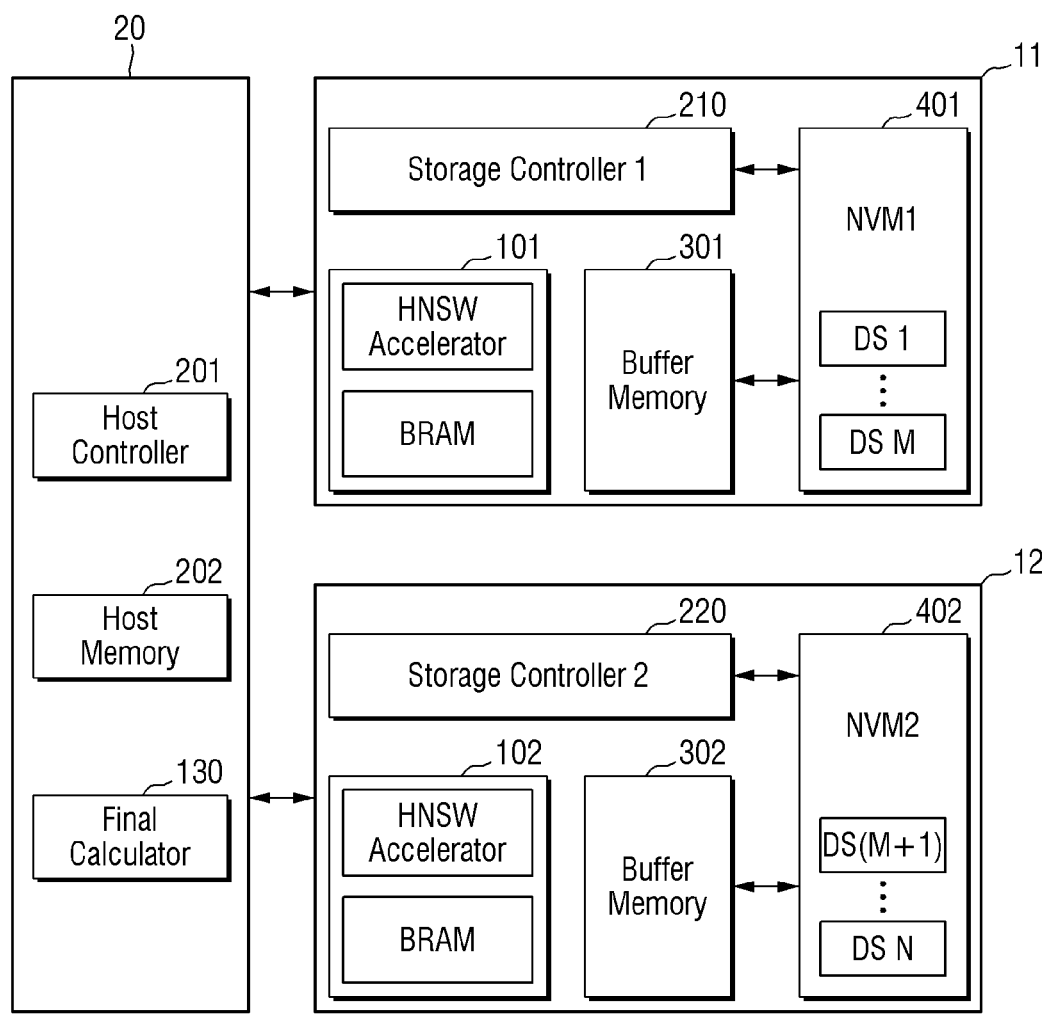
FIG. 15 is a diagram which shows a memory system according to an embodiment of the present invention.

FIG. 15 is a diagram which shows a memory system according to an embodiment of the present invention. For convenience of explanation, points different from those described referring to FIGS. 1 and 14 will be mainly described.

Referring to FIG. 15, a memory system 3 may include a first storage device 11, a second storage device 12, and a host 20.

The first storage device 11 may include a first storage controller 210, a first FPGA 101, and a first non-volatile memory 401.

The first non-volatile memory 401 may store a first dataset to an M dataset (DS1 to DSM).

The first FPGA 101 may perform a computing process on the first dataset to the M dataset (DS1 to DSM) on the basis of the first input query. The accelerator included in the first FPGA 101 may generate the first final candidate data, using the first dataset DS1. The first FPGA 101 may provide the generated first final candidate data to the host 20.

The second storage device 12 may include a second storage controller 220, a second FPGA 102, and a second non-volatile memory 402.

The second non-volatile memory 402 stores a first M+1 dataset to a $N^{th}$ dataset (DS(M+1) to DS N) different from the first dataset to the M dataset (DS1 to DSM).

The second FPGA 102 may perform a computing process from the M+1 dataset to the $N^{th}$ dataset (DS(M+1) to DS N) on the basis of a second input query. The accelerator included in the second FPGA 102 may generate the second final candidate data using the M+1 dataset to the $N^{th}$ dataset (DS(M+1) to DS N). The second FPGA 102 may provide the generated second final candidate data to the host 20.

That is, the first FPGA 101 and the second FPGA 102 may perform computations in parallel, using different datasets on the basis of the same query.

The host memory 202 may function as a buffer memory that temporarily stores the first final candidate data provided from the first FPGA 101 and the second final candidate data provided from the second FPGA 102.

The final calculator 130 included in the host 20 may generate final result data, using the first final candidate data and the second final candidate data stored in the host memory 202. The final calculator 130 may include a Brute-force calculator. The final calculator 130 may include an acceleration circuit for Brute-force computation. Therefore, the first FPGA 101 and the second FPGA 102 may not separately include the final calculator 130. That is, the first FPGA 101 and the second FPGA 102 may provide the host 20 with the first and second final candidate data that have not been computed through the final calculator 130.

Figure 16:
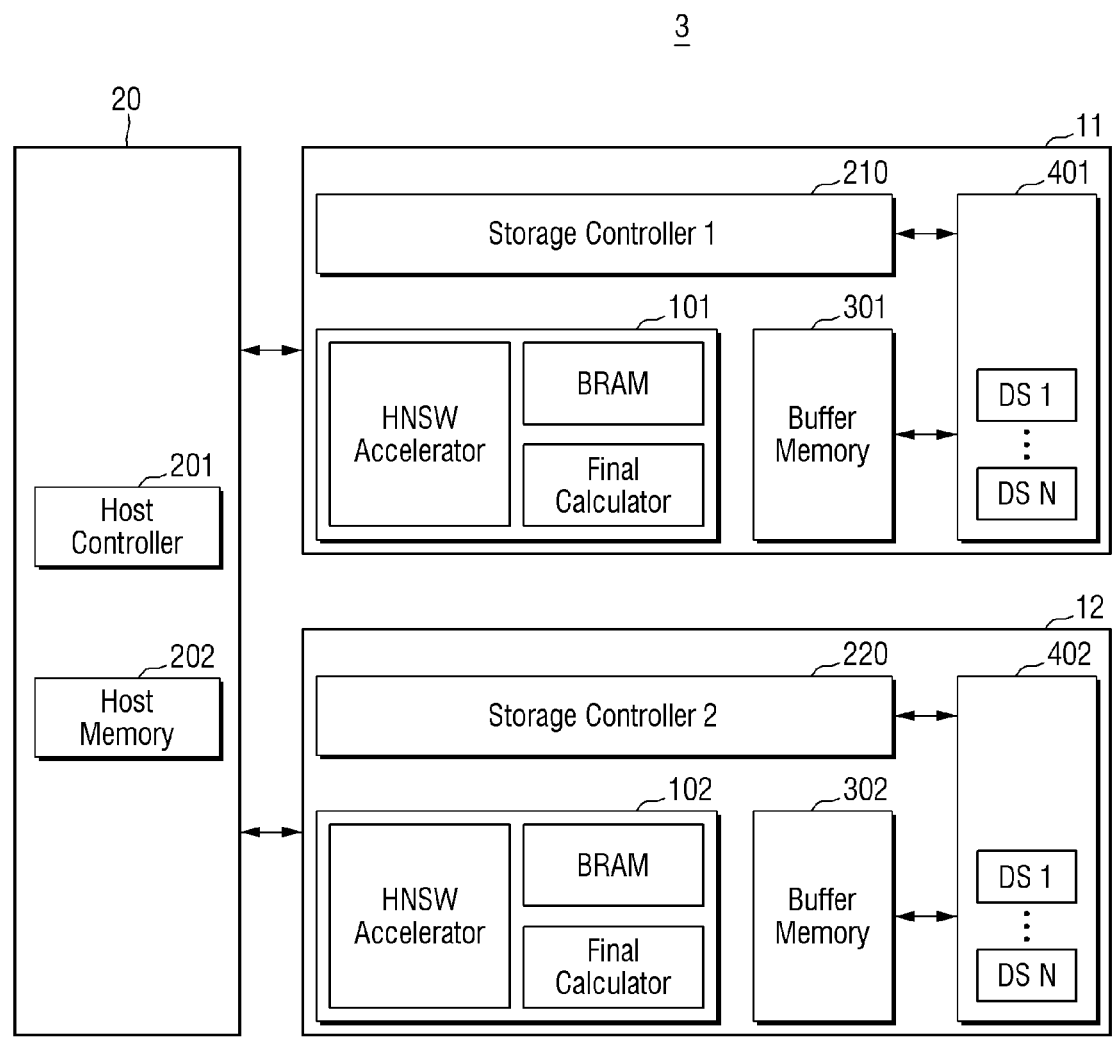
FIG. 16 is a diagram which shows the memory system according to an embodiment of the present invention.

FIG. 16 is a diagram which shows the memory system according to an embodiment of the present invention. For convenience of explanation, points different from those described referring to FIG. 15 will be mainly described.

Referring to FIG. 16, a memory system 4 may include a first storage device 11, a second storage device 12, and a host 20.

A first non-volatile memory 401 may store the first dataset DS1 to a $n^{th}$ dataset DS N. That is, the first non-volatile memory 401 may store a plurality of datasets.

The first FPGA 101 includes a first final calculator. The first FPGA 101 may generate the first final result data, using a plurality of datasets (first dataset DS1 to $n^{th}$ dataset DS N) stored in the first non-volatile memory 401. At this time, the first FPGA 101 may generate the first final result data on the basis of the first input query. The first FPGA 101 may provide the generated first final result data to the host 20.

The second non-volatile memory 402 may store the first dataset DS1 to the $n^{th}$ dataset DS N. That is, the second non-volatile memory 402 may store a plurality of datasets that are the same as the plurality of datasets stored in the first non-volatile memory 401.

The second FPGA 102 includes a second final calculator. The second FPGA 102 may generate the second final result data, using a plurality of datasets (first dataset DS1 to $n^{th}$ dataset DS N) stored in the second non-volatile memory 402. At this time, the second FPGA 102 may generate the second final result data on the basis of the second input query different from the first input query provided to the first FPGA 101. The second FPGA 102 may provide the generated second final result data to the host 20.

Unlike those described referring to FIG. 15, the host 20 does not include a final calculator. That is, the host 20 does not perform additional computation, but may receive the first final result data in which all the computations are completed by the first storage device 11, and may receive the second final result data in which all the computations are completed by the second storage device 12.

Figure 17:
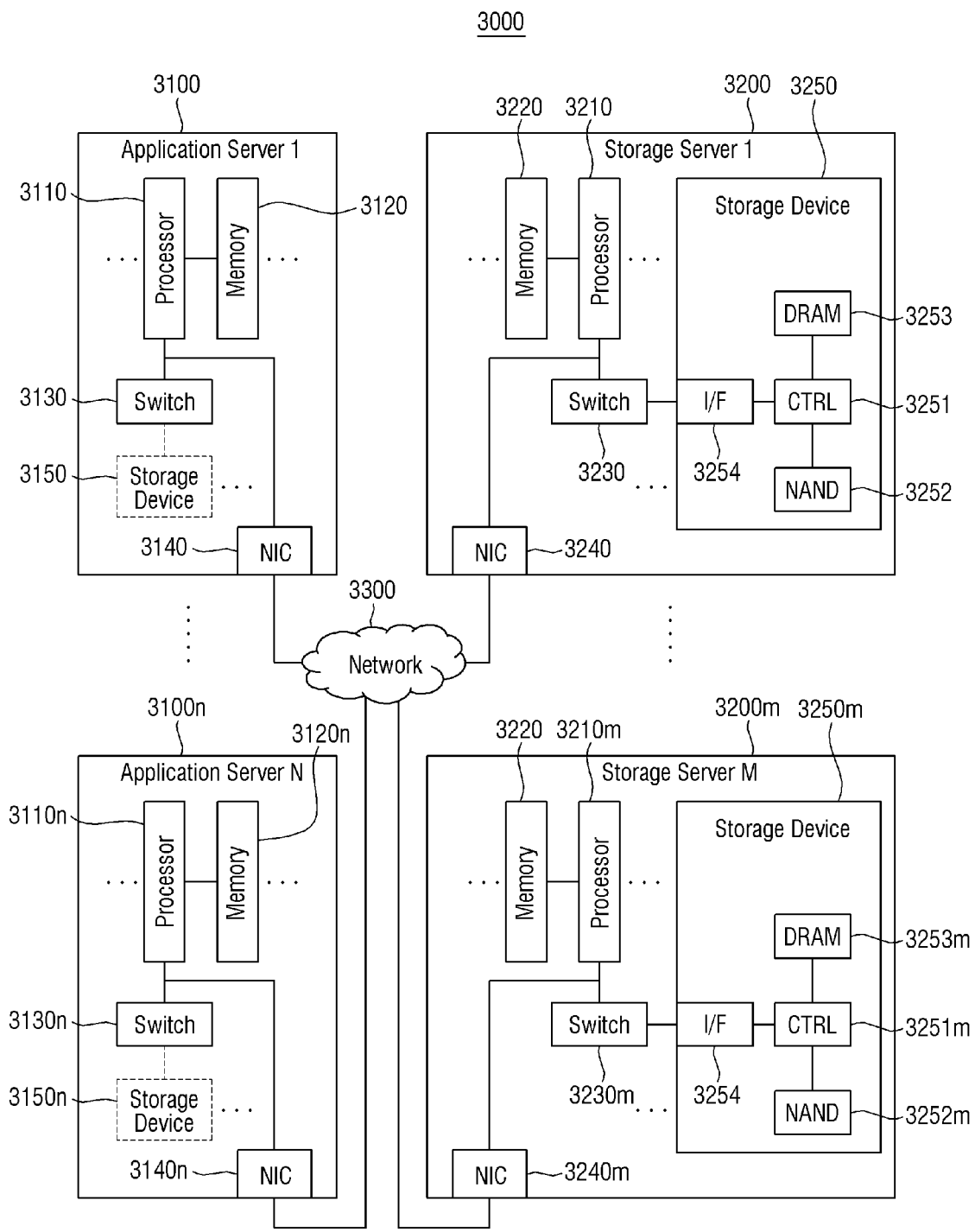
FIG. 17 is a diagram which shows a data center which includes the storage device according to an embodiment of the present invention.

FIG. 17 is a diagram which shows a data center which includes the storage device according to an embodiment of the present invention.

Referring to FIG. 17, a data center 3000 is a facility that gathers various types of data and provides services, and may also be referred to as a data storage center. The data center 3000 may be a system for performing a search engine and database operation, and may be a computing system used by corporations such as banks or government agencies. The data center 3000 may include application servers 3100 to 3100n and storage servers 3200 to 3200m. The number of application servers 3100 to 3100n and the number of storage servers 3200 to 3200m may be variously selected depending on the embodiments, and the number of application servers 3100 to 3100n and the number of storage servers 3200 to 3200m may be different from each other.

The application server 3100 or the storage server 3200 may include at least one of processors 3110 and 3210 and memories 3120 and 3220. Taking the storage server 3200 as an example, the processor 3210 may control the overall operation of the storage server 3200, and access the memory 3220 to execute command and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM or a Non-Volatile DIMM (NVMDIMM). According to embodiments, the number of processors 3210 and the number of memories 3220 included in the storage server 3200 may be variously selected. In an embodiment, the processor 3210 and the memory 3220 may provide a processor-memory pair. In an embodiment, the number of processors 3210 and memories 3220 may be different from each other. The processor 3210 may include a single core processor or a multi-core processor. The aforementioned explanation of the storage server 3200 may also be similarly applied to the application server 3100. According to an embodiment, the application server 3100 does not include a storage device 3150. The storage server 3200 may include at least one or more storage devices 3250. The number of storage devices 3250 included in the storage server 3200 may be variously selected depending on the embodiments. The storage device 3250 may include the storage device 10 described referring to FIGS. 1 to 16. That is, the storage device 3250 may provide the host with the result of performing the computing process using the data stored in the non-volatile memory, by including the FPGA 100.

The application servers 3100 to 3100*n* and the storage servers 3200 to 3200*m* may communicate with each other through a network 3300. The network 3300 may be implemented, using a Fibre Channel (FC), an Ethernet, or the like. At this time, FC is a medium used for a relatively high-speed data transfer, and may use an optical switch that provides high performance/high availability. The storage servers 3200 to 3200*m* may be provided as a file storage, a block storage or an object storage, depending on the access type of the network 3300.

In an embodiment, the network 3300 may be a storage-only network such as a Storage region Network (SAN). For example, the SAN may be an FC-SAN which uses an FC network and is implemented according to a FC Protocol (FCP). As another example, the SAN may be an IP-SAN which uses a TCP/IP network and is implemented according to an iSCSI (SCSI over TCP/IP or Internet SCSI) protocol. In another embodiment, the network 3300 may be a general network such as a TCP/IP network. For example, the network 3300 may be implemented, according to protocols such as an FC over Ethernet (FCoE), a Network Attached Storage (NAS), and an NVMe over Fabrics (NVMe-oF).

Hereinafter, the application server 3100 and the storage server 3200 will be mainly described. Explanation of the application server 3100 may also be applied to another application server 3100*n*, and explanation of the storage server 3200 may also be applied to another storage server 3200*m*.

The application server 3100 may store the data requested to store by a user or client in one of the storage servers 3200 to 3200*m* through the network 3300. Further, the application server 3100 may acquire the data requested to read by the user or client from one of the storage servers 3200 to 3200*m* through the network 3300. For example, the application server 3100 may be implemented as a Web server, a Database Management System (DBMS) or the like.

The application server 3100 may access a memory 3120*n* or a storage device 3150*n* included in another application server 3100*n* through the network 3300, or may access the memories 3220 to 3220*m* or the storage devices 3250 to 3250*m* included in the storage servers 3200 to 3200*m* through the network 3300. Accordingly, the application server 3100 may perform various operations on the data stored in the application servers 3100 to 3100*n* and/or the storage servers 3200 to 3200*m*. For example, the application server 3100 may execute commands for moving or copying the data between the application servers 3100 to 3100*n* and/or the storage servers 3200 to 3200*m*. At this time, the data may be moved from the storage devices 3250 to 3250*m* of the storage servers 3200 to 3200*m* via the memories 3220 to 3220*m* of the storage servers 3200 to 3200*m*, or may be directly moved to the memories 3120 to 3120*n* of the application servers 3100 to 3100*n*. Data which moves through the network 3300 may be data encrypted for security and privacy.

Taking the storage server 3200 as an example, an interface 3254 may provide a physical connection between the processor 3210 and a controller 3251, and a physical connection between the Network InterConnect (NIC) 3240 and the controller 3251. For example, the interface 3254 may be implemented in a Direct Attached Storage (DAS) type in which the storage device 3250 is directly connected with a dedicated cable. Further, for example, the interface 3254 may be implemented in various interface types, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI express (PCIe), a NVM express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and/or a compact flash (CF) card interface.

The storage server 3200 may further include a switch 3230 and a NIC 3240. The switch 3230 may selectively connect the processor 3210 and the storage device 3250 or may selectively connect the NIC 3240 and the storage device 3250, according to the control of the processor 3210.

In an embodiment, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a DSP, a host bus interface, or the like, and may be connected to the processor 3210 and/or the switch 3230, or the like through the host bus interface. The host bus interface may also be implemented as one of the examples of the interface 3254 described above. In an embodiment, the NIC 3240 may also be integrated with at least one of the processor 3210, the switch 3230, and the storage device 3250.

In the storage servers 3200 to 3200*m* or the application servers 3100 to 3100*n*, the processor may transmit the commands to the storage devices 3150 to 3150*n* and 3250 to 3250*m* or the memories 3120 to 3120*n* and 3220 to 3220*m* to program or read the data. At this time, the data may be data in which an error is corrected through an Error Correction Code (ECC) engine. The data may be subjected to data bus inversion (DBI) or a data masking (DM) process, and may include Cyclic Redundancy Code (CRC) information. The data may be encrypted for security and privacy.

The storage devices 3150 to 3150*m* and 3250 to 3250*m* may transmit the control signal and command/address signal to the NAND flash memory devices 3252 to 3252*m* in response to the read command received from the processor. Accordingly, when data is read from the NAND flash memory devices 3252 to 3252*m*, the Read Enable (RE) signal is input as a data output control signal, and may serve to output the data to the DQ bus. A Data Strobe (DQS) may be generated, using the RE signal. Commands and address signals may be latched to the page buffer, depending on a rising edge or a falling edge of a Write Enable (WE) signal.

The controller 3251 may generally control the operation of the storage device 3250. In an embodiment, the controller 3251 may include a Static Random Access Memory (SRAM). The controller 3251 may write data in the NAND flash 3252 in response to a write command, or may read the data from the NAND flash 3252 in response to a read command. For example, the write command and/or the read command may be provided from the processor 3210 in the storage server 3200, a processor 3210*m* in another storage server 3200*m* or the processors 3110 and 3110*n* in the application servers 3100 and 3100*n*. A DRAM 3253 may temporarily store (buffer) the data to be written in the NAND flash 3252 or the data read from the NAND flash 3252. Also, the DRAM 3253 may store meta data. Here, the meta data is a user data or data generated by the controller 3251 to manage the NAND flash 3252. The storage device 3250 may include a Secure Element (SE) for security and privacy.

In concluding the detailed description, those skilled in the art will appreciate that many variations and modifications may be made to the embodiments without substantially departing from the principles of the present invention. Therefore, the disclosed embodiments of the invention are used in a generic and descriptive sense only and not for purposes of limitation.

What is claimed is:

1. A storage device comprising:
   a controller which receives a command from a host for instructing performance of a first computation;
   a non-volatile memory which stores a plurality of datasets;
   a buffer memory, wherein a first dataset among the plurality of datasets stored in the non-volatile memory is provided to the buffer memory in response to the command; and
   an accelerator which performs the first computation corresponding to the command, using the first dataset provided to the buffer memory,
   wherein the accelerator comprises:
      a memory access module which receives a first input query and a second input query for instructing the first computation and the first dataset from the buffer memory, wherein the first input query is different from the second input query;
      a first computing module which is connected to the memory access module and determines first final candidate data corresponding to the first input query, using the first dataset received from the memory access module, wherein the first computing module calculates first vector distances between the first input query and entry points of the first dataset and retains the first vector distances that are shorter than a minimum distance as the first final candidate data; and
      a second computing module which is connected to the memory access module and determines second final candidate data corresponding to the second input query, using the same first dataset received from the memory access module, wherein the second computing module calculates second other vector distances between the second input query and the entry points and retains the second vector distances that are shorter than a minimum distance as the second final candidate data,
      wherein at least one of the computing modules:
         maintains a visit list that tracks previously evaluated data points within the corresponding dataset, wherein a data point from the corresponding dataset is added to the visit list after its vector distance to the corresponding input query has been calculated;
         maintains a candidate list comprising unvisited data points within the corresponding dataset, wherein a data point from the corresponding dataset is added to the candidate list when its vector distance to the corresponding input query is within a predefined distance threshold and has not been previously evaluated; and
         selects the corresponding final candidate data based on data points in the candidate list that meet a predefined threshold,
      wherein a block random-access memory (RAM) of the storage device includes a first block RAM storing an activated visit list and a second block RAM storing an initialized visit list.

2. The storage device of claim 1, wherein the accelerator includes a Field Programmable Gate Array (FPGA).

3. The storage device of claim 1, wherein the accelerator performs the first computation, using a hierarchical navigable small world (HNSW) search algorithm.

4. The storage device of claim 1, wherein the memory access module includes a final calculator,
   the first computing module includes a first calculator and a first comparator,
   the first calculator performs a calculation based on the first input query, using the first dataset,
   the first comparator determines the first final candidate data, using a result calculated by the first calculator, and
   the final calculator determines a first final result data, using the first final candidate data determined by the first comparator.

5. The storage device of claim 4, wherein the second computing module includes a second comparator and a second calculator,
   the second calculator performs the calculation based on the second input query,
   the second comparator determines the second final candidate data, using the result calculated by the second calculator, and
   the final calculator determines a second final result data, using the second final candidate data determined by the second comparator.

6. The storage device of claim 5, wherein the accelerator provides the host with first and second final result data.

7. The storage device of claim 1, wherein the memory access module and the first computing module are connected by a first-in-first-out (FIFO) interface.

8. The storage device of claim 1, wherein the non-volatile memory provides the first dataset to the buffer memory in a peer-to-peer communication, using Peripheral Component Interconnect express (PCIe).

9. A memory system comprising:
   a host which provides a command for instructing performance of a first computation; and
   a first storage device to which the command is provided from the host,
   wherein the first storage device comprises:
      a first controller which controls the first storage device in response to the command;
      a first non-volatile memory which stores a first dataset;
      a first buffer memory which receives the first dataset from the first non-volatile memory in response to the command; and
      a first accelerator which performs the first computation corresponding to the command, using the first dataset provided to the first buffer memory,
      wherein the first accelerator comprises:

a first memory access module which receives a first input query and a second input query for instructing the first computation and the first dataset from the first buffer memory, wherein the first input query is different from the second input query;

a first computing module which is connected to the first memory access module and determines first final candidate data corresponding to the first input query, using the first dataset received from the first memory access module, wherein the first computing module calculates first vector distances between the first input query and entry points of the first dataset and retains the first vector distances that are shorter than a minimum distance as the first final candidate data; and a second computing module which is connected to the first memory access module and determines second final candidate data corresponding to the second input query, using the same first dataset received from the memory access module, wherein the second computing module calculates second other vector distances between the second input query and the entry points and retains the second vector distances that are shorter than a minimum distance as the second final candidate data, and wherein the first accelerator provides the host with the first final candidate data and the second final candidate data, wherein at least one of the computing modules:

maintains a visit list that tracks previously evaluated data points within the corresponding dataset, wherein a data point from the corresponding dataset is added to the visit list after its vector distance to the corresponding input query has been calculated;

maintains a candidate list comprising unvisited data points within the corresponding dataset, wherein a data point from the corresponding dataset is added to the candidate list when its vector distance to the corresponding input query is within a predefined distance threshold and has not been previously evaluated; and selects the corresponding final candidate data based on data points in the candidate list that meet a predefined threshold, wherein a block random-access memory (RAM) of the memory system includes a first block RAM storing an activated visit list and a second block RAM storing an initialized visit list.

10. The memory system of claim 9, further comprising:
a second storage device to which the command is provided from the host,
wherein the second storage device includes
a second controller which controls the second storage device in response to the command,
a second non-volatile memory which stores a second dataset different from the first dataset,
a second buffer memory which receives the second dataset from the second non-volatile memory in response to the command, and
a second accelerator which performs the first computation corresponding to the command, using the second dataset provided to the second buffer memory,
the second accelerator determines a second final candidate data corresponding to the first input query using the second dataset and provides the second final candidate data to the host, and the host determines a final result data, using the first final candidate data and the second final candidate data.

11. The memory system of claim 9, further comprising:
a second storage device to which the command is provided from the host,
wherein the second storage device includes
a second controller which controls the second storage device in response to the command,
a second non-volatile memory which stores the first dataset, and
a second buffer memory which receives the first dataset from the second non-volatile memory in response to the command, and
a second accelerator which receives a third input query from the second buffer memory, determines a third final candidate data corresponding to the third input query using the first dataset provided to the second buffer memory, and provides the third final candidate data to the host.

12. The memory system of claim 9, wherein the host provides the command to the first storage device, using a Peripheral Component Interconnect express (PCIe), and
the first accelerator provides the host with first final candidate data, using the PCIe.

13. The memory system of claim 9, wherein the first accelerator includes a Field Programmable Gate Array (FPGA).

14. The memory system of claim 9, wherein the first non-volatile memory provides the first dataset to the first buffer memory in a peer-to-peer communication, using a Peripheral Component Interconnect express (PCIe).

15. A storage device comprising:
a controller which receives a command from a host for instructing performance of a first computation and generates a control signal corresponding to the command;
a non-volatile memory which stores a first dataset and a second dataset;
a buffer memory which receives the first dataset and the second dataset from the non-volatile memory in a peer-to-peer communication in response to the control signal; and
an accelerator which generates a first final result data corresponding to the control signal, using the first dataset and the second dataset provided to the buffer memory,
wherein the accelerator comprises:
a memory access module which receives a first input query corresponding to the control signal, the first dataset, and the second dataset from the buffer memory;
a random-access-memory (RAM); and
a first computing module which performs the first computation in response to the memory access module receiving the first input query, wherein the first computation:
determines whether an index associated with the first input query is cached in the RAM;
dynamically retrieves the index from the non-volatile memory or the buffer memory when the index is not cached in the RAM;
retrieves a first data point from the first dataset and a second data point from the second dataset based on the index;
computes a distance between the first input query and each of the retrieved data points;

selects first final candidate data from the first dataset and second final candidate data from the second dataset, by evaluating the computed distances against a predefined similarity threshold; and provides the memory access module with the first final candidate data and the second final candidate data, wherein the memory access module generates the first final result data using the first final candidate data and the second final candidate data, and provides the first final result data to the host, and wherein a block RAM of the storage device includes a first block RAM storing an activated visit list and a second block RAM storing an initialized visit list.

16. The storage device of claim 15, wherein the accelerator includes a Field Programmable Gate Array (FPGA).

17. The storage device of claim 15, wherein the accelerator further includes a second computing module, wherein the memory access module is further provided with a second input query corresponding to the control signal from the buffer memory, the second computing module generates a third final candidate data corresponding to the second input query using the first dataset, and generates a fourth final candidate data corresponding to the second input query using the second dataset, the second computing module provides the memory access module with the third final candidate data and the fourth final candidate data, and the memory access module generates a second final result data using the third final candidate data and the fourth final candidate data, and provides the second final result data to the host.

18. The storage device of claim 15, wherein the first dataset includes a plurality of first data, the second dataset includes a plurality of second data, the first computing module determines a first nearest data having a vector distance nearest to the first input query among the plurality of first data, as the first final candidate data, and the first computing module determines a second nearest data having a vector distance nearest to the first input query among the plurality of second data, as the second final candidate data.

19. The storage device of claim 15, wherein the accelerator generates the first final result data, using a nearest neighbor search algorithm.

20. The storage device of claim 15, wherein the RAM is a block RAM (BRAM).

* * * * *